J. T. VANDUZER.
Bee Hive.
No. 45,657. Patented Dec. 27, 1864.
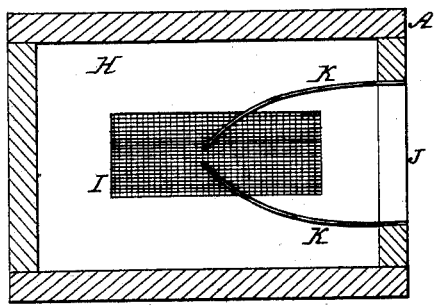
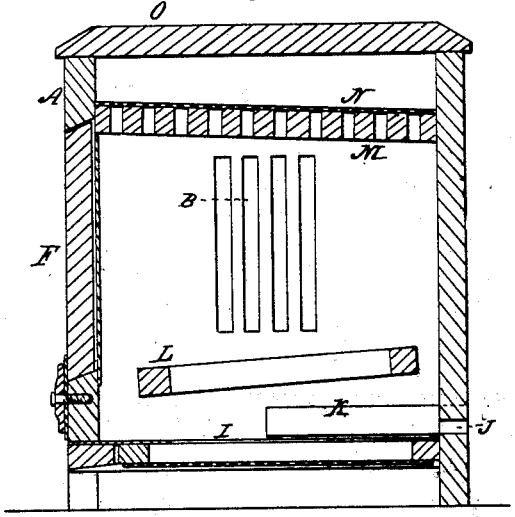
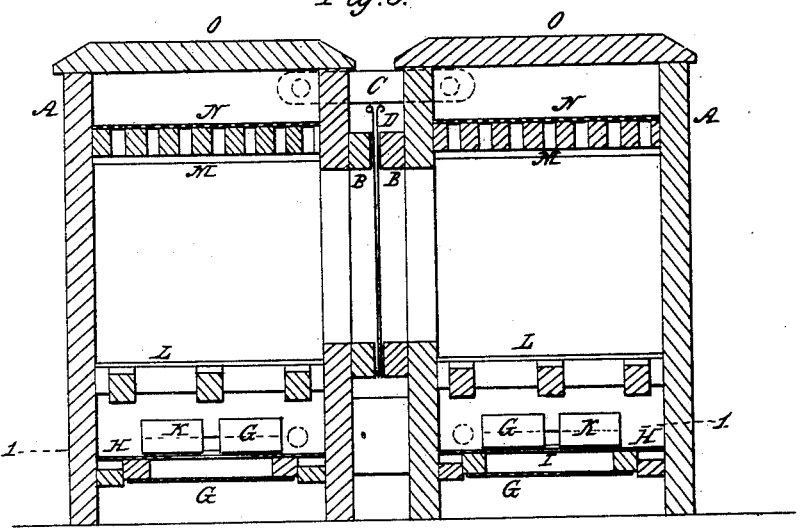
Witnesses:
C. L. Topliff
Henry Morris
Inventor:
J. T. Vanduzer
per Munn & Co.
attorneys

UNITED STATES PATENT OFFICE.

J. T. VAN DUZER, OF TYRONE, NEW YORK.

IMPROVEMENT IN BEE-HIVES.

Specification forming part of Letters Patent No. 45,657, dated December 27, 1864.

*To all whom it may concern:*

Be it known that I, J. T. VAN DUZER, of Tyrone, in the county of Schuyler and State of New York, have invented a new and useful Improvement in Bee-Hives; and I do hereby declare that the following is a full, clear, and exact description thereof, which will enable those skilled in the art to make and use the same, reference being had to the accompanying drawings, forming a part of this specification, in which—

Figure 1 shows a sectional plan view of the bottom of the hive on the dotted line 1 in Fig. 3. Fig. 2 shows a sectional side elevation of the hive on a vertical middle line. Fig. 3 is a sectional front elevation of two hives joined together.

Similar letters of reference indicate like parts.

A represents the hive, of which two are shown in Fig. 3. It stands elevated above the ground or supporting-surface, so as to bring its bottom G above the ground. This bottom is made of wire-gauze, so as to ventilate the hive, while worms and other enemies are excluded. A metallic diaphragm, H, is fixed across the hive above the bottom G, and this diaphragm is cut away in the cencer, as at I, for the double purpose of permitting the ascent of air into the hive and of trapping the worms which may enter through the door J. Upon each side of the entrance-door J, I fix upright metal guides, which reach forward into the hive, resting upon the diaphragm H and curving inward toward each other until they nearly touch, and terminating at about the center of the opening I. The result of this construction is that any vermin which crawl into the entrance J will be directed into the opening I, and so be trapped below the diaphragm, from whence they can be removed from time to time by the attendant. The grated bottom L above the entrance is made to incline toward the front of the hive, as shown in Fig. 2, and the top M of the honey-chamber is inclined in the opposite direction, so as to facilitate the removal of the comb therefrom. This top is perforated, and above it is fixed a wire-gauze covering, N, which will prevent the escape of the bees in that direction when the cover O of the hive is removed for any purpose.

It becomes necessary to remove the cover O for ventilation when the hive is smoked for the purpose of removing the bees to another hive. The front of the hive has windows of glass, darkened and protected by a solid blind, F. The honey is to be removed through the window. Upon one side of the hive I make a slotted opening, B, shown in Fig. 2, which I close by a slide, D. The object of this is to be able to connect two hives together so as to become in effect one hive. When the slotted openings of two hives are brought together, the slides are withdrawn and the hives are secured to each other by straps C C both on the front and rear of the hives.

I claim as new and desire to secure by Letters Patent—

The combination of the converging guides K, the diaphragm H with its opening I, the wire-gauze bottom G, and the door J, constructed substantially as above described.

J. T. VAN DUZER.

Witnesses:
 DAN. ARNOLD,
 L. A. KNOX.